United States Patent
Herring, Sr.

(10) Patent No.: US 6,890,429 B2
(45) Date of Patent: May 10, 2005

(54) SYSTEMS AND METHODS FOR TREATING WASTE WATER

(75) Inventor: William T. Herring, Sr., Newton Grove, NC (US)

(73) Assignee: Hog Slat, Inc., Newton Grove, NC (US)

(*) Notice: Subject to any disclaimer, the term of this patent is extended or adjusted under 35 U.S.C. 154(b) by 0 days.

(21) Appl. No.: 10/464,116

(22) Filed: Jun. 18, 2003

(65) Prior Publication Data
US 2004/0256299 A1 Dec. 23, 2004

(51) Int. Cl.<sup>7</sup> .............................. C02F 3/02; C02F 1/52; B01D 33/04
(52) U.S. Cl. .................... 210/167; 210/198.1; 210/396; 210/400; 210/609; 210/621; 210/631
(58) Field of Search .............................. 210/167, 198.1, 210/396, 400, 620, 621, 631, 702, 705, 712, 776, 780, 783, 609

(56) References Cited

U.S. PATENT DOCUMENTS

| | | | |
|---|---|---|---|
| 3,773,659 A | 11/1973 | Carlson et al. | |
| 3,886,068 A | 3/1975 | Eron | |
| 4,239,620 A | * 12/1980 | Doll et al. | 210/601 |
| 5,204,007 A | 4/1993 | Mosley et al. | |
| 5,209,851 A | * 5/1993 | Hume et al. | 210/610 |
| 5,222,807 A | 6/1993 | Gaddis | |
| 5,770,092 A | * 6/1998 | Sharir | 210/738 |
| 5,897,785 A | 4/1999 | Billings | |
| 6,054,044 A | 4/2000 | Hoffland et al. | |
| 6,190,566 B1 | 2/2001 | Kolber | |
| 6,207,057 B1 | 3/2001 | White | |
| 6,250,476 B1 | * 6/2001 | Kroon et al. | 209/272 |
| 6,284,054 B1 | 9/2001 | Galvin | |
| 6,350,608 B1 | 2/2002 | Teran et al. | |
| 2001/0013497 A1 | 8/2001 | Kolber | |
| 2001/0025820 A1 | 10/2001 | Morse et al. | |
| 2002/0030012 A1 | 3/2002 | Sullivan et al. | |

FOREIGN PATENT DOCUMENTS

| | | | |
|---|---|---|---|
| EP | 0111379 A1 | * | 6/1984 |
| FR | 2 240 193 A1 | | 3/1975 |
| GB | 687296 A | | 2/1953 |
| GB | 1 593 132 A | | 7/1981 |
| JP | 64-63096 | * | 3/1989 |

* cited by examiner

Primary Examiner—Fred G. Prince
(74) Attorney, Agent, or Firm—Alston & Bird LLP

(57) ABSTRACT

Systems and methods for treating waste water containing biological wastes such as animal waste generated in livestock-raising operations, wherein the waste water is subjected to a series of operations to separate solids from the liquid phase of the waste water and to biologically treat the waste water to break down organic components. The separated solids are stored for further treatment or conversion into useful materials. The treated liquid phase can be put to various uses. In one embodiment, the treated liquid is recycled as flush water for flushing animal waste from an animal barn, whereby little or no liquid phase escapes the system into the surrounding environment.

20 Claims, 4 Drawing Sheets

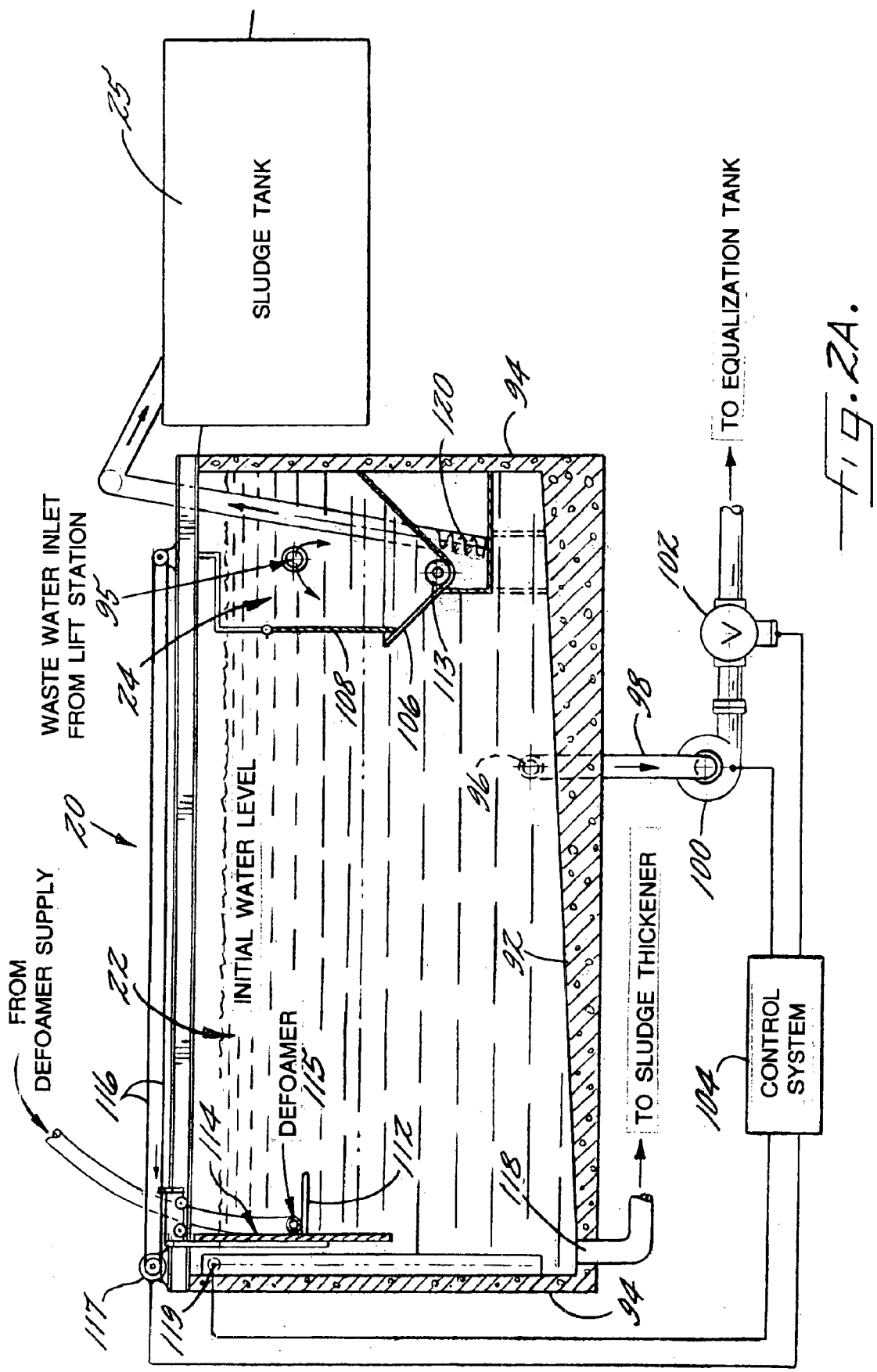

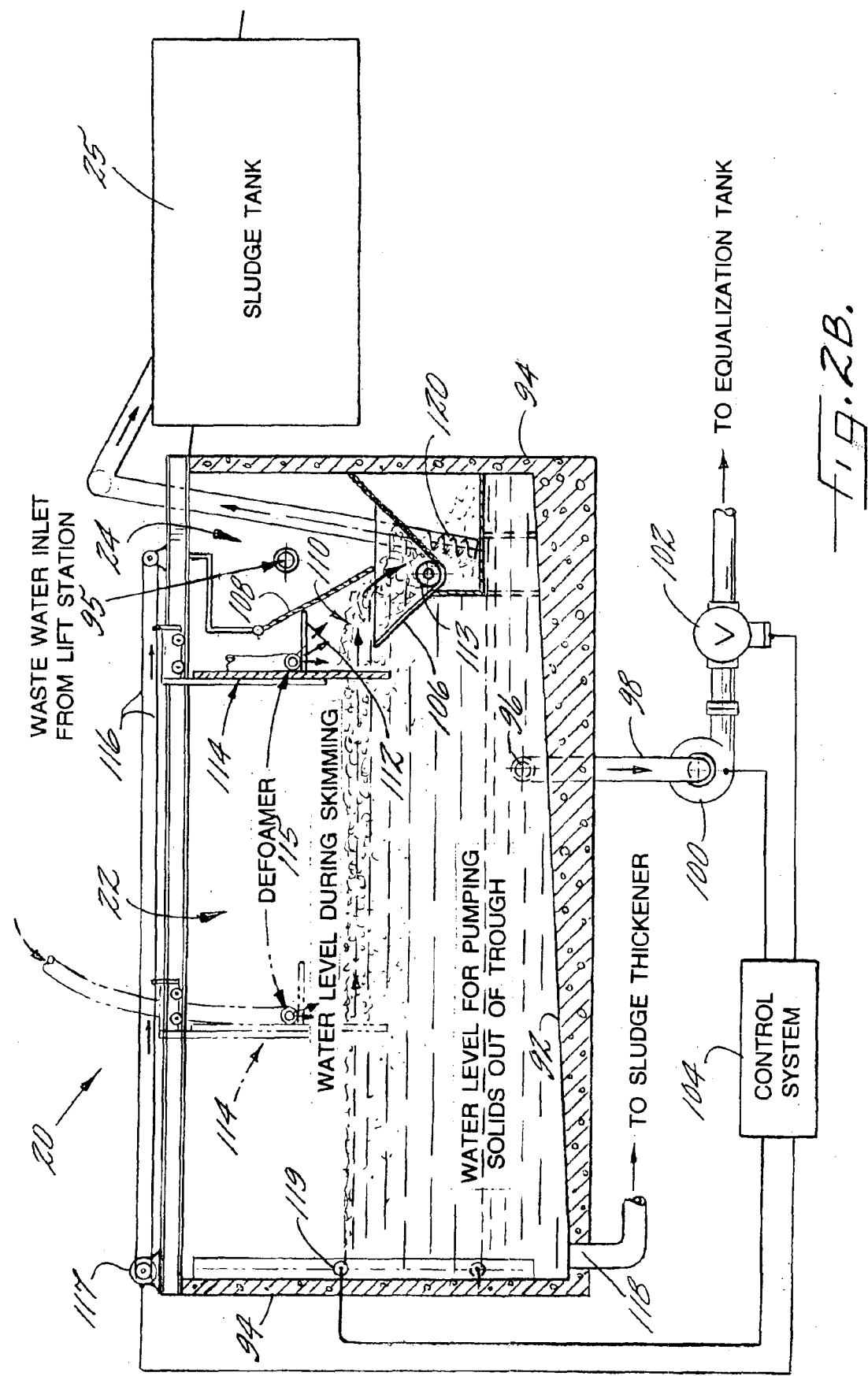

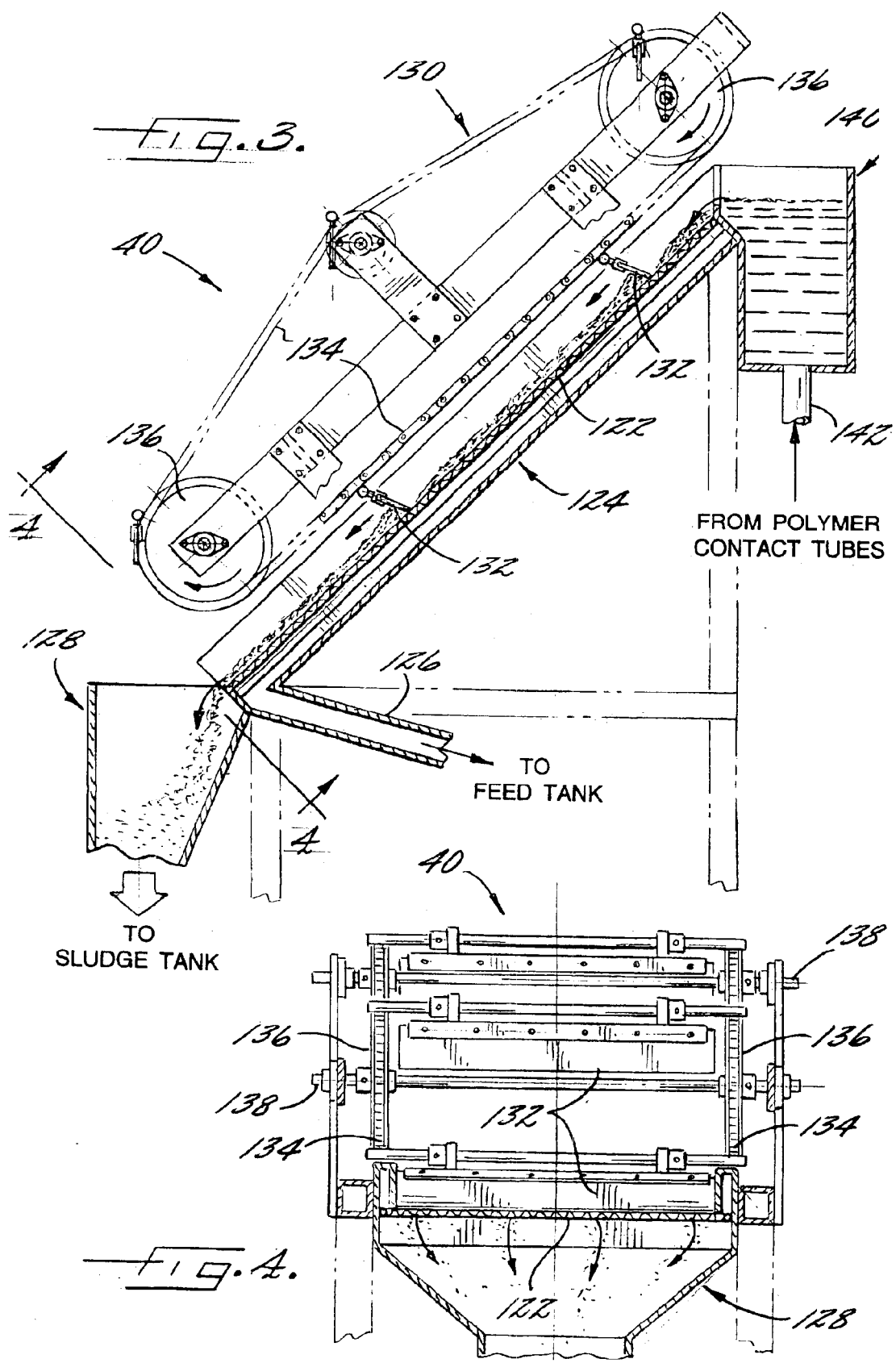

SYSTEMS AND METHODS FOR TREATING WASTE WATER

FIELD OF THE INVENTION

The invention relates to the treatment of waste water, which may include biological waste, and more particularly may include animal waste generated in the raising of livestock.

BACKGROUND OF THE INVENTION

In large-scale animal husbandry operations, substantial amounts of animal waste are generated. Modern methods of raising livestock facilitate capturing that waste in such a way that treatment of the waste can be undertaken. For example, hogs often are now raised in "high-density" hog barns each of which can hold several hundred animals. Such hog barns are usually equipped with slotted floors that allow animal waste to pass through the floor into a space below. A flush system is operated periodically to flush the waste from the subfloor space using water. Once flushed from the hog barn, the waste can be handled in various ways depending on the particular installation.

Often the waste is simply pumped into a large lagoon near the barn, where it undergoes a slow anaerobic digestion. The treated waste then may be sprayed onto fields. A drawback of such lagoons is that during certain weather conditions, such as hurricanes or flooding, the waste water can be displaced from the lagoon into the surrounding environment.

It would be beneficial if the total amount of waste entering the environment surrounding a livestock-raising operation could be reduced.

SUMMARY OF THE INVENTION

The invention addresses the above needs and achieves other advantages, by providing systems and methods for treating waste water containing biological wastes such as animal waste generated in livestock-raising operations, wherein the waste water is subjected to a series of operations to separate solids from the liquid phase of the waste water and to biologically treat the waste water to break down organic components. The separated solids are stored for further treatment or conversion into useful materials. The treated liquid phase can be put to various uses. In one embodiment, the treated liquid is recycled as flush water for flushing animal waste from an animal barn, whereby little or no liquid phase escapes the system into the surrounding environment.

In one embodiment of the invention, a system for treating waste water that includes liquid components and solids components comprises a skimmer apparatus comprising a holding tank and a solids receptacle adjacent thereto. The skimmer apparatus has an inlet for receiving the waste water and a liquid outlet arranged below a level of an upper surface of the waste water in the holding tank through which liquid outlet the waste water is discharged from the holding tank. The skimmer apparatus further comprises a skimmer arranged for movement across the holding tank to skim floating solids from the upper surface of the waste water, and a solids receptacle for receiving the solids skimmed by the skimmer. The system also includes a screening apparatus arranged to receive the waste water from the liquid outlet of the skimmer apparatus, the screening apparatus being structured and arranged to screen the waste water to remove coagulated suspended solids therefrom so as to create a solids stream and a liquid stream. Additionally, the system comprises a biological reactor arranged to receive the liquid stream from the screening apparatus, the biological reactor comprising a tank for holding the waste water received from the screening apparatus, and an aerator disposed within the tank and operable to inject air into the waste water therein for biologically treating the waste water, the biological reactor having an outlet for discharging treated waste water therefrom.

When the system is used in connection with an animal barn having a waste removal system for flushing animal waste produced by the animals from the animal barn, waste water treated in the biological reactor can be fed to the inlet of the waste removal system of the animal barn to be used as flush water to flush animal waste therefrom, and the flush water and animal waste from the animal barn can be fed into the inlet of the skimmer apparatus. Thus, the liquid phase of the effluent stream from the animal barn is continuously recycled through the barn and the treatment system so that little or no liquid is released to the surrounding environment.

The air injected into the waste water in the biological reactor is preferably heated so as to maintain the waste water above a minimum temperature necessary for the biological reaction to occur. Accordingly, the waste water is heated to an elevated temperature. If the heated waste water were fed back to the animal barn during warm conditions such as during the summer, the temperature in the barn may become higher than desired. In accordance with one embodiment of the invention, during warm ambient conditions, the waste water can be fed from the biological reactor into a holding reservoir (e.g., a pond) where the water can be cooled before being fed back to the barn. Conversely, during cold ambient conditions, the holding reservoir can be bypassed such that the elevated-temperature water when fed to the animal barn helps heat the barn.

The skimmer apparatus preferably comprises a variable-geometry gate at a discharge end of the holding tank adjacent the solids receptacle. The variable-geometry gate is movable between a closed position in which the gate prevents floating solids in the holding tank from passing into the solids receptacle, and an open position in which the gate allows the floating solids to be swept by the skimmer into the solids receptacle. In one advantageous embodiment, the variable-geometry gate comprises a fixed lower portion and a movable upper portion. The upper portion in the closed position of the gate engages the lower portion. In the open position of the gate, the upper portion is pivoted away from the lower portion to create an opening through which the floating solids are swept by the skimmer into the solids receptacle. The movable upper portion can be pivoted by mechanical action of the skimmer as it draws near the gate; for example, the skimmer can support one or more arms that push the upper portion open.

The skimmer apparatus advantageously also comprises a pump system connected to the liquid outlet of the holding tank, and a control system operable to control the operation of the pump system. The control system is operable to cause the pump system to pump liquid out from the liquid outlet so as to lower the level of the upper surface of the waste water in the holding tank to a level allowing floating solids to be swept into the solids receptacle. The control system also controls movement of the skimmer across the holding tank. Once the level of the waste water is lowered, the skimmer is started across the tank to skim the floating solids from the surface and sweep them into the solids receptacle.

The skimmer apparatus in one embodiment includes a defoamer for knocking down the thick layer of frothy foam that can form on the upper surface of the waste water in the holding tank of the apparatus and can cling to the side walls and other surfaces. The defoamer preferably comprises a water spray system for spraying water on the foam. The water spray system can comprise a pipe closed at both ends and fed with water through a T-junction or the like, and mounted on the traversing skimmer so that it extends transversely across the holding tank. The pipe can have outlet holes spaced apart along its length for spraying water onto the foam. As the skimmer moves across the tank, the water spray knocks down the foam.

The system can also include an equalization tank arranged between the skimmer apparatus and the screening apparatus for holding the waste water discharged from the skimmer apparatus for a period of time prior to treatment by the screening apparatus, the equalization tank serving to even out time-wise fluctuations in concentrations of waste components of the waste water fed to the screening apparatus and biological reactor. In this manner, the downstream components and system processes are not subjected to large "spikes" in waste concentration.

The system can also include a system for introducing a coagulant into the waste water prior to the waste water being fed to the screening apparatus so as to cause solids in the waste water to coagulate to facilitate removal by the screening apparatus. The system for introducing a coagulant advantageously comprises a serpentine flow passage for increasing the residence time of a mixture of the waste water and the coagulant. In one embodiment, the serpentine flow passage is defined by a plurality of elongate vertical tubes arranged one after another in a generally parallel array. The mixture of waste water and coagulant is fed into the bottom end and out the top end of each tube in sequence.

In one embodiment, a settling tank is arranged to receive the liquid stream from the screening apparatus and operable to allow suspended solids in the liquid stream to settle to a bottom of the settling tank as sludge, the settling tank having a sludge outlet for discharging the sludge and a liquid outlet for discharging liquid. Advantageously, there is a connection between the sludge of the settling tank and the inlet of the skimmer apparatus for feeding the sludge back to the skimmer apparatus. In this manner, the sludge is sent back through the system to allow more solids to be skimmed, coagulated and separated, thereby reducing the load on the biological reactor.

The system can also include a clarifier arranged to receive treated waste from the biological reactor. The system can be arranged such that sludge created in the clarifier is fed back into the skimmer apparatus.

The invention also provides a skimmer apparatus for separating waste water into a first component comprising predominantly solids and a second component comprising predominantly liquid. The skimmer apparatus comprises a holding tank for holding a quantity of the waste water in a substantially quiescent state such that solids in the waste water float to the surface, a solids receptacle adjacent a discharge end of the holding tank, a skimmer movable across the holding tank for skimming floating solids from the surface of the waste water into the solids receptacle, and a variable-geometry gate at the discharge end of the holding tank adjacent the solids receptacle. The variable-geometry gate is movable between a closed position in which the gate prevents floating solids in the holding tank from passing into the solids receptacle, and an open position in which the gate allows the solids to be swept by the skimmer into the solids receptacle. The variable-geometry gate comprises a fixed lower portion and a movable upper portion, the upper portion in the closed position of the gate engaging the lower portion, the upper portion in the open position of the gate being pivoted away from the lower portion to create an opening in the gate through which the floating solids are swept by the skimmer into the solids receptacle.

The skimmer apparatus advantageously also comprises a pump system connected to the liquid outlet of the holding tank, and a control system operable to control the pump system, the control system being operable to cause the pump system to pump liquid out from the holding tank so as to lower the level of the surface of the waste water in the holding tank to a level allowing the floating solids to be swept into the solids receptacle, and thereafter to cause the skimmer to begin moving across the holding tank towards the discharge end thereof. Preferably, the control system is operable to periodically cycle operation of the pump system and skimmer so that discharging of liquid from the holding tank and skimming of solids into the solids receptacle occur on a periodic basis.

The invention also provides a screening apparatus for treating a mixture containing liquid and solids. The solids can comprise animal waste as well as hair. The screening apparatus comprises a fine-mesh screen arranged in an inclined orientation, the screen having an upper end and a lower end and having an upper surface, the screen allowing liquid to flow downwardly through apertures therein while preventing solids larger than the apertures from passing through the screen. The apparatus also includes an inlet arranged proximate the upper end of the screen for feeding the mixture onto the upper surface of the screen such that the mixture flows downward along the screen toward the lower end thereof. A plurality of substantially liquid-impervious squeegees are connected to a drive member arranged in an endless loop and driven by a motor, the squeegees being spaced apart about the loop of the drive member, the squeegees contacting the upper surface of the screen and being driven by the drive member to move downward along the upper surface of the screen so as to scrape solids from the screen. The squeegees also serve as dams operable to prevent the mixture from flowing past the squeegees along the screen such that residence time of the mixture on the screen is increased.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2A is a schematic representation of a skimming apparatus in accordance with one embodiment of the invention, wherein the variable-geometry gate is closed and the waste water level is relatively high;

FIG. 2B is a view similar to FIG. 2A, showing the waste water level having been lowered and showing the skimmer having been moved across the tank to sweep floating solids into the solids receptacle;

FIG. 3 is a side view of a screening apparatus in accordance with the invention; and FIG. 4 is a view of the screening apparatus along the direction indicated by line 4—4 in FIG. 3.

DETAILED DESCRIPTION OF THE INVENTION

Figure 1:
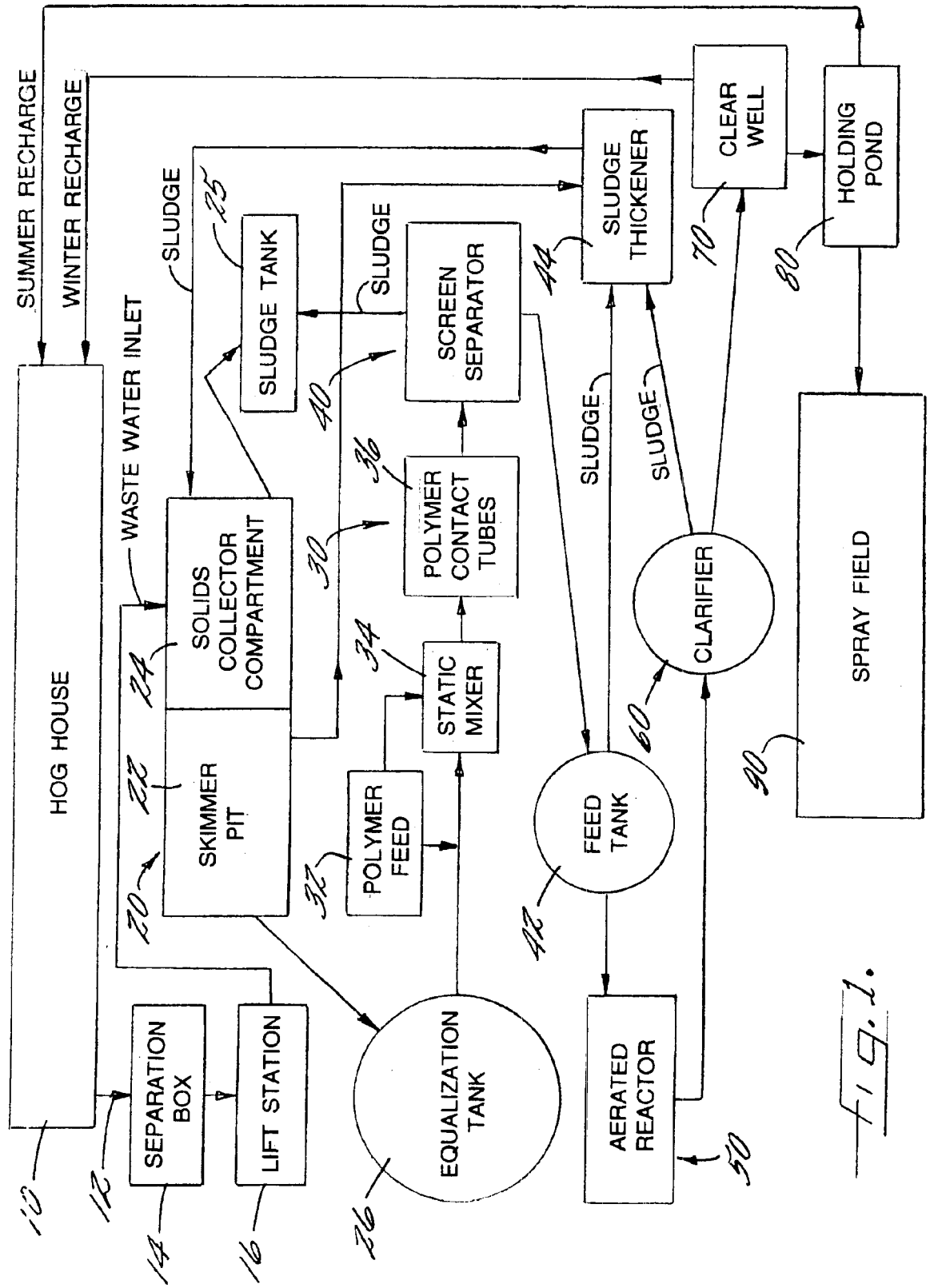
FIG. 1 is a diagrammatic depiction of a system and process for treating waste flushed from an animal barn in accordance with one embodiment of the invention.

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A waste water treatment system in accordance with one embodiment of the present invention is depicted in FIG. 1, for treating waste water generated in an animal husbandry operation, such as hog farming. An animal barn or hog house 10 houses animals. In one particular type of animal barn, the floor of the barn is slotted so that animal waste falls down through the floor into a subfloor space below the slotted floor. A flush system or waste removal system (not shown) can be used to periodically flush the subfloor space with water to flush the animal waste out from the animal barn; the flushed animal waste and flush water, which collectively are referred to herein as waste water, exit the animal barn from an outlet 12.

In accordance with one embodiment of the invention as depicted in FIG. 1, the waste water is treated in a treatment system and process, and is then recycled back to the animal barn 10 as flush water. Accordingly, little or no liquid waste escapes from the system into the surrounding environment. The primary components of the treatment system include a skimmer apparatus 20, a coagulation system 30, a screening apparatus 40, a biological reactor 50, and a clarifier 60. Additional components are described below.

The waste water from the animal barn 10 is fed into the skimmer apparatus 20. Prior to feeding the water into the skimmer apparatus, the water optionally can be passed through a separation box 14 that includes a grate or the like for separating and removing large objects (e.g., trash that falls through the animal barn floor into the subfloor space, bones of animals that die in captivity and are cannibalized by the other animals, etc.). Where the skimmer apparatus is at a higher vertical level than the barn, the waste water can be fed into an optional pumping or lift station 16 operable to raise the waste water up to a suitable level. The water is then fed into the skimmer apparatus.

The skimmer apparatus 20, which is described in further detail below in connection with FIGS. 2A and 2B, provides an initial, physical separation of the waste water into two phases, namely, a predominantly liquid phase and a high-solids-content phase (also referred to herein as sludge). The skimmer apparatus accomplishes this initial separation by allowing the waste water to sit in a quiescent state in a holding tank or skimmer pit 22 for a period of time to allow some of the solids to float to the surface, and skimming the floating solids off the surface into a solids receptacle 24 adjacent the skimmer pit. Solids from the solids receptacle are fed into a sludge tank 25 where they are held for a period of time. The sludge tank can be emptied periodically and the solids or sludge can be put to various uses or further treated in other processes that are not described herein.

The predominantly liquid phase from the skimmer apparatus 20 is fed into an equalization tank 26, which holds a large quantity of the liquid. Although some of the solids are removed in the skimmer apparatus, the waste water still contains some amount of solids. The equalization tank 26 functions to reduce the variability in the solids concentration of the waste water that is passed to the next downstream process in the system, and thereby prevents large "spikes" in solids concentration from passing through the system.

From the equalization tank 26, the waste water preferably is fed to the coagulation system 30 before being screened in the screening apparatus 40. The coagulation system operates to coagulate some of the remaining solids in the waste water, some of which are in the form of fine suspended masses, so that the fine masses tend to agglomerate into larger masses that can be removed by the screening apparatus. To this end, the coagulation system includes a coagulant feed 32 operable to feed a coagulant (typically a polymer material) into the waste water. The coagulation system may also include a static mixer 34 or other type of mixing device for mixing the coagulant into the waste water to improve the uniformity of dispersion of the coagulant. The waste water preferably is then passed through an array 36 of elongate vertical (or generally vertical) tubes in serpentine fashion. The array 36 is designed to increase the residence time of the waste water and coagulant mixture before it reaches the screening apparatus. The tubes are arranged generally parallel to each other. The waste water is fed into the bottom end of one tube and emerges from the top end of the tube, then is led back down and fed into the bottom end of the next tube and out the top end of the tube, and so on in serpentine fashion. As an alternative to the use of a plurality of separate tubes, other types of arrangements for creating a long flow passage could be used, such as a single tube formed into a serpentine shape, or other structure.

The waste water is fed from the coagulation system 30 to the screen separator or screening apparatus 40, where the coagulated solids and other solid materials are screened out from the water. The solids separated out by the screening apparatus are ultimately transferred into the sludge tank 25, while the liquid is passed on to the next step of the treatment process. The screening apparatus is further described below in connection with FIGS. 3 and 4.

The waste water discharged from the screening apparatus 40 is fed into a feed tank 42 (not illustrated in detail in the drawings), which holds a relatively large quantity of the waste water. The feed tank's inlet is located in one side wall of the tank, and a liquid outlet is arranged in the same or a different side wall, preferably at a higher vertical level than the inlet. The feed tank can also include a skimmer for skimmer any floating solids from the surface of the water into a collection trough or the like. Some settling of solids occurs in the feed tank; accordingly, there is a sludge outlet at the bottom of the tank. The sludge formed at the bottom of the feed tank (and any skimmed solids) is fed into a sludge thickener 44, which constitutes a large tank where the sludge is held until it can be pumped out to the solids receptacle 24 of the skimmer apparatus, from which it ultimately is fed into the sludge tank 25.

The predominantly liquid waste water in the feed tank 42 is discharged from the liquid outlet of the feed tank and fed into the biological reactor 50. Depending on the needed capacity of the system, there could be more than one such reactor. The biological reactor comprises a tank for holding the waste water, and an aeration system (not shown) for injecting air into the waste water so as to oxygenate the water and promote biological breakdown of organic substances in the water. The microorganisms that effect the breakdown tend to become inactive if the temperature of the water falls below about 65° F. Accordingly, the air injected into the water preferably is heated to a level sufficient to ensure that the water in the reactor remains above 65° F., and more preferably remains at about 80° F. to 85° F. To accomplish this, the air preferably is heated to about 90° F. to 100° F. above the ambient temperature.

The aeration system preferably is operable to create very fine air bubbles in the waste water. Various types of aerating devices can be used in the practice of the invention. One suitable type comprises an elastomeric membrane having a plurality of small slits that open up to create small openings when the membrane is inflated by pressurized air, but that substantially close up when the membrane is not inflated. The membrane can comprise a sleeve that fits closely about a circular pipe (e.g., a PVC pipe) that is supplied with pressurized air through its central passage and that has a plurality of radial holes extending from the central passage to the outer surface of the pipe, for example as shown in U.S. Pat. No. 5,234,632. Alternatively, the membrane can be in the form of a disc forming one wall of a pressurized chamber. Other types of aerating devices can also be used. A plurality of such devices typically are distributed at the bottom of the biological reactor.

The treated waste water from the biological reactor 50 is fed to a clarifier 60. The clarifier is generally similar in design and operation to the feed tank 42 previously described, although the liquid outlet of the clarifier preferably is located near the top end of the tank. The clarifier holds the treated waste water for a sufficient period of time for the suspended biological sludge to settle into the bottom of the tank by gravity and to separate from the treated wastewater. Sludge formed in the clarifier is fed to the sludge thickener 44. The clarifier can be a simple tank that allows gravity separation. However, it should be recognized that chemical flocculating agents may be used if necessary to cause a suspended sludge to settle. Various clarifiers have been developed that could be suitably used in the practice of the invention, although it is typically not necessary to use clarifiers of more complex design.

The clarified liquid phase of the waste water is fed from the clarifier to the clear well 70. The clear well 70 is typically an open, stirred tank that can be kept within the same building as the clarifier. The clear well serves to hold water from the waste water treatment system at a constant temperature for recirculation to the animal barn for use as flush water. The flush water helps to dilute and liquefy the animal waste for ease in transferring the collected animal waste to separation box 14 in accordance with the invention. The clear well is able to maintain the clarified waste water at a suitable temperature during winter conditions because it is typically maintained indoors, or can be separately heated, if necessary, for use as a recharge to the animal barn in the winter.

As noted, heated air is bubbled through the waste water in the biological reactor, and hence the water in the clear well 70 is at an elevated temperature relative to the temperature it otherwise would have. During warm ambient conditions (e.g., during summer), recycling the elevated-temperature water back to the animal barn 10 might tend to raise the temperature in the barn to an undesirable level. Accordingly, during such warm conditions, the water can be fed from the clear well to a holding reservoir or pond 80 where the water can be retained for a period of time so that it cools before being recycled to the barn. Some of the water in the holding reservoir can be sprayed on nearby fields 90 if desired. Conversely, during cold ambient conditions (e.g., during winter), the barn may need to be heated to maintain the temperature inside the barn at the desired level. The elevated-temperature water in the clear well can assist in the heating, and hence during such cold conditions, the holding reservoir can be bypassed and the water can be fed directly from the clear well to the barn.

The skimmer apparatus 20 is now described in greater detail with reference to FIGS. 2A and 2B. As previously noted, the skimmer apparatus comprises a skimmer pit or holding tank 22 within which a solids receptacle 24 is disposed. The holding tank 22 is formed by a bottom wall 92 (which preferably is slightly inclined in the direction toward the solids receptacle, as shown) and a plurality of side walls 94 upstanding from the bottom wall. Waste water is received into the holding tank through an inlet 95, which preferably is arranged to dump the waste water into the solids receptacle. The holding tank has a liquid outlet 96 located in one of the side walls some distance above the bottom wall for discharging predominantly liquid waste water. An outlet conduit 98 is connected to the liquid outlet. A pump 100 and a controllable valve 102 are arranged in the outlet conduit; a control system 104 is connected to the pump and valve for controlling their operation, as further described below.

The waste water received in the holding tank 22 is allowed to remain in the tank in a quiescent state for a certain period of time so that some of the solids in the waste water can float to the surface as shown in FIG. 2A. The solids receptacle 24 essentially comprises a sieve-like structure, preferably formed as a V-shaped trough 106 located a distance above the bottom wall 92 of the tank 22 and extending transversely across the tank from one side wall substantially to an opposite side wall. The walls of the trough 106 are perforated to allow liquid to freely pass through the walls while preventing larger bodies of solids from passing through. Located adjacent the trough 106 is a gate having a movable portion 108 that is pivotally mounted at its upper edge to suitable fixed structure in the skimmer apparatus. The movable portion 108 is pivotable about its upper edge between a closed position (FIG. 2A) in which the lower edge of the movable portion engages one wall of the trough 106 (which constitutes a fixed portion of the overall gate structure) so as to form a wall essentially separating the solids receptacle from the rest of the tank, and an open position (FIG. 2B) in which the movable portion 108 is pivoted away from the trough 106 so as to form an opening 110 through which floating solids in the holding tank can be moved into the solids receptacle 24. The movable portion 108 can be moved by various mechanisms, including but not limited to a suitable actuator (not shown) such as a pneumatic or hydraulic cylinder or electric motor, which actuator can also be controlled by the control system 104. However, as further described below, in the preferred embodiment, the movable portion 108 is simply pushed open by the skimmer of the skimmer apparatus when it nears the trough 106.

One or more water level sensors 119 are arranged in the holding tank for sensing the level of the upper surface of the water. The sensor 119 can comprise a float-type device or other suitable sensor capable of detecting the water level in the tank. The sensor 119 is connected to the control system 104 that controls the operation of the pump and valve in the outlet conduit 98. Although not illustrated, it will be understood that similar pump and valve equipment is included in the inlet conduit system that feeds the waste water into the holding tank, and such pump and valve equipment is also controlled by the control system 104. The control system is able to control the water level in the holding tank by suitably controlling the various pumps and valves. During the quiescent holding period when solids are allowed to float to the surface, the water level is controlled to be well above the top of the trough 106, as shown in FIG. 2A.

When it is desired to skim off the floating solids, the valve 102 is opened and the pump 100 is operated to pump liquid out from the holding tank 22 to the equalization tank 26 (FIG. 1) until the upper surface of the water in the holding tank is at a predetermined level (e.g., about 12 inches above the top end of the trough 106). The skimmer apparatus includes a skimmer 114 mounted on a suitable traversing mechanism such as the schematically illustrated chain and sprocket system 116 so that the skimmer can be traversed across the holding tank. The skimmer comprises a plate or the like fixed to the traversing mechanism at its upper end and extending downward toward the bottom wall of the holding tank. The lower end of the skimmer is slightly lower than the upper edge of the trough 106. The traversing mechanism is operated to cause the skimmer 114 to slowly move across the holding tank from the end farthest from the solids receptacle toward the end nearest the solids receptacle. The skimmer can include one or more arms 112 that project from the skimmer in the direction of the solids receptacle and that push open the movable gate portion 108 as the skimmer nears the solids receptacle. The skimmer pushes the floating solids through the resulting opening 110 into the solids receptacle as shown in FIG. 2B.

Next, the pump system is operated to lower the water level in the skimmer apparatus still further, so that the water level is below the bottom of the trough 106. As noted, the walls of the trough 106 are perforated with holes sized to allow the liquid to pass through while substantially preventing the solids from passing through. Consequently, a substantial proportion of the solids remain in the trough 106.

Preferably, an auger 113 is arranged at the bottom of the trough for conveying the solids in the trough to one end thereof, where the solids are dumped into a receiving area, which is arranged below the trough in the illustrated embodiment. A suitable conveyor, such as a screw conveyor or auger 120, periodically conveys solids out of the solids receiving area into the sludge tank 25 (FIG. 1).

The skimmer is then traversed back to its starting position at the opposite end of the holding tank. The pump system is operated to pump more waste water into the holding tank to begin another cycle of operation. This cyclic operation is repeated on a regular periodic basis, such as once every 24 hours, or any other suitable period of time.

The skimmer apparatus can include a defoamer for knocking down the thick, frothy layer of foam that can tend to form at the surface of the waste water in the tank. The defoamer in one embodiment comprises a pipe 115 mounted on the traversing skimmer 114 and fed with water by an attached hose as shown. The pipe 115 extends across the width of the tank 22. The pipe is capped at one end (if the hose feeds into the opposite end) or at both ends (if the hose is connected to the pipe through a T-junction), and has holes in its side wall spaced apart (e.g., every 12 inches) along the length of the pipe. Thus, water pumped to the pipe sprays out from the holes for knocking down the foam. The water can be pumped from the tank 22 so that the defoamer system essentially forms a recirculating system.

The skimmer apparatus 20 also includes a sludge outlet 118 in the bottom wall of the holding tank. Some solids in the waste water tend to settle at the bottom and collect to form a sludge. During each cycle of operation of the skimmer apparatus, sludge is pumped out from the sludge outlet 118 and fed to the sludge thickener 44 (FIG. 1). As previously noted, the sludge from the sludge thickener is then recycled back to the solids receptacle.

The screening apparatus 40 is now described in further detail with reference to FIGS. 3 and 4. The screening apparatus includes a metal screen 122 that is inclined relative to horizontal. The screen has openings suitably sized so that the coagulated solids formed in the coagulation system 30 (FIG. 1) and other solids in the waste water (e.g., animal hair) tend not to be able to pass through the openings, while liquid phase can pass through. Formed beneath the screen is a liquid collector or pan 124 for catching liquid that passes through the screen from its upper surface through the openings and out from the lower surface of the screen. A liquid outlet 126 is connected to the pan 124 for conducting the liquid to the feed tank 42 (FIG. 1). Arranged below the lower edge of the screen is a solids collector 128 for catching solids that are swept off the upper surface of the screen by a sweeping system 130.

The sweeping system 130 comprises a plurality of spaced squeegees 132 made of rubber or the like, driven to move along the upper surface of the screen 122 from the upper edge toward the lower edge thereof. The squeegees are substantially impervious to liquid. The sweeping system includes a pair of endless chain loops 134 adjacent opposite sides of the screen, each chain being looped about a pair of sprockets 136 respectively located near the upper and lower ends of the screen. The sprockets near the lower end of the screen are mounted on a common shaft 138 that extends transversely above the screen, and the sprockets near the upper end of the screen are mounted on a common shaft 138 that extends transversely above the screen. One of the shafts 138 constitutes a drive shaft rotatably driven by a suitable motor (not shown) for rotating the chain loops. The squeegees 132 are affixed to the chain loops, and the chains drive the squeegees so they are scraped along the upper surface of the screen.

The screening apparatus also includes a waste water feed box or nozzle 140 located adjacent the upper end of the screen. The feed nozzle 140 is configured to extend across substantially the full width of the screen and to dump waste water onto the upper surface of the screen at its upper end. Waste water from the polymer contact tubes 36 (FIG. 1) of the coagulation system is fed into the feed nozzle via an inlet conduit 142 connected to the nozzle. The waste water spills out from the nozzle onto the screen.

As the squeegees 132 are swept down the upper surface of the screen, they act as dams that prevent the waste water from flowing down past them, thereby allowing liquid to pass through the screen into the collector pan 124. Solids that cannot pass through the screen openings are retained on the upper surface of the screen and are swept by the squeegees into the solids collector 128.

When the screening apparatus is used in a hog farming waste water treatment system as shown in FIG. 1, the openings in the screen must be appropriately sized to substantially prevent coagulated solids and other materials such as animal hair from passing through the screen. The optimum size of the openings depends on various factors including the characteristics of the solids in the waste water.

The system and method for treating waste water as described above can be used for treating waste water of various origins, including but not limited to waste water generated in an animal husbandry operation such as high-density hog farming, waste water generated in municipal sewage systems, and waste water generated in industrial processes.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for treating waste water that includes liquid components and solid components, the system comprising:
   a skimmer apparatus comprising a holding tank for receiving the waste water and having a liquid outlet arranged below a level of an upper surface of the waste water in the holding tank through which liquid outlet the waste water is discharged from the holding tank, the skimmer apparatus further comprising a skimmer arranged for movement across the holding tank to skim floating solids from the upper surface of the waste water, and a solids receptacle for receiving the solids skimmed by the skimmer;
   a screening apparatus arranged to receive the waste water from the liquid outlet of the skimmer apparatus, the screening apparatus being structured and arranged to screen the waste water to remove coagulated suspended solids therefrom so as to create a solids stream and a liquid stream; and
   a biological reactor arranged to receive the liquid stream from the screening apparatus, the biological reactor comprising a tank for holding the waste water received from the screening apparatus, and an aerator disposed within the tank and operable to inject air into the waste water therein for biologically treating the waste water, the biological reactor having an outlet for discharging treated waste water therefrom.

2. The system of claim 1, further comprising an animal barn for housing animals, the animal barn having a waste removal system for flushing animal waste produced by the animals from the animal barn, the waste removal system having an inlet for flush water used for flushing the animal waste from the animal barn and an outlet through which the flush water and animal waste are discharged from the animal barn, and wherein the system is arranged such that waste water treated in the biological reactor is fed to the inlet of the waste removal system for the animal barn to be used as flush water to flush animal waste therefrom, and the flush water and animal waste from the animal barn are fed into the inlet of the skimmer apparatus.

3. The system of claim 2, wherein the animal barn has a floor having apertures through which the animal waste falls to a space beneath the floor, and wherein the waste removal system is operable to feed the flush water into the space beneath the floor to flush the animal waste from the animal barn.

4. The system of claim 2, wherein the air injected into the biological reactor is heated to a temperature exceeding ambient temperature prior to injection into the waste water, such that the waste water in the biological reactor becomes elevated in temperature.

5. The system of claim 4, further comprising a holding reservoir, and wherein during cold ambient conditions the elevated-temperature waste water is fed from the biological reactor back to the animal barn bypassing the holding reservoir, and during warm ambient conditions the elevated-temperature waste water is fed from the biological reactor to the holding reservoir where the waste water is cooled prior to being fed back to the animal barn.

6. The system of claim 2, further comprising a separation device disposed between the animal barn and the skimmer apparatus, the separation device receiving the waste water from the animal barn and processing the waste water to remove relatively large objects so that said objects are not passed on to the skimmer apparatus.

7. The system of claim 6, further comprising a lift station disposed between the separation device and the skimmer apparatus, the lift station being operable to raise the waste water in height before being passed to the skimmer apparatus.

8. The system of claim 1, wherein the skimmer apparatus further comprises a variable-geometry gate at a discharge end of the holding tank adjacent the solids receptacle, the variable-geometry gate being movable between a closed position in which the gate prevents floating solids in the holding tank from passing into the solids receptacle, and an open position in which the gate allows the floating solids to be swept by the skimmer into the solids receptacle.

9. The system of claim 8, wherein the variable-geometry gate comprises a fixed lower portion and a movable upper portion, the upper portion in the closed position of the gate engaging the lower portion, the upper portion in the open position of the gate being pivoted away from the lower portion to create an opening through which the floating solids are swept by the skimmer into the solids receptacle.

10. The system of claim 9, wherein the skimmer apparatus further comprises a pump system connected to the liquid outlet of the holding tank, and a control system operable to control operation of the pump system, the control system being operable to cause the pump system to pump liquid out from the liquid outlet so as to lower the level of the upper surface of the waste water in the holding tank to a level allowing floating solids to be swept into the solids receptacle.

11. The system of claim 1, further comprising an equalization tank arranged between the skimmer apparatus and the screening apparatus for holding the waste water discharged from the skimmer apparatus for a period of time prior to treatment by the screening apparatus, the equalization tank serving to even out time-wise fluctuations in concentrations of waste components of the waste water fed to the screening apparatus and biological reactor.

12. The system of claim 1, further comprising a system for introducing a coagulant into the waste water prior to the waste water being fed to the screening apparatus so as to cause solids in the waste water to coagulate to facilitate removal by the screening apparatus.

13. The system of claim 12, wherein the system for introducing a coagulant comprises a serpentine flow passage for increasing the residence time of a mixture of the waste water and the coagulant.

14. The system of claim 13, wherein the serpentine flow passage is defined by a plurality of elongate generally vertical tubes arranged one after another in a generally parallel array, wherein the mixture of waste water and coagulant is fed into a bottom end and is brought out a top end of each of the tubes in sequence.

15. The system of claim 1, wherein the screening apparatus comprises a screen arranged on an incline so that the waste water flows downward along an upper surface of the screen, and a squeegee system having a plurality of squeegees arranged to engage the upper surface of the screen and move one after another downward along the screen to allow liquid from the waste water to flow through the screen while solids are prevented from flowing therethrough, the squeegees scraping the solids from the screen into a catch basin.

16. The system of claim 1, further comprising a feed tank arranged to receive the liquid stream from the screening apparatus and operable to allow suspended solids in the liquid stream to settle to a bottom of the feed tank as sludge, the feed tank having a sludge outlet for discharging the sludge and a liquid outlet for discharging liquid.

17. The system of claim 16, further comprising a connection between the sludge outlet of the feed tank and the solids receptacle of the skimmer apparatus for feeding the sludge back to the solids receptacle.

18. The system of claim 1, further comprising a clarifier arranged to receive treated waste from the biological reactor.

19. The system of claim 18, wherein the system is arranged such that sludge created in the clarifier is fed back into the skimmer apparatus.

20. The system of claim 19, further comprising a sludge thickener disposed between the clarifier and the skimmer apparatus, the sludge thickener receiving the sludge from the clarifier, and sludge from the sludge thickener being fed to the solids receptacle of the skimmer apparatus.

* * * * *